S. M. LANGSTON.
STOP MECHANISM.
APPLICATION FILED JUNE 5, 1913.

1,124,468.

Patented Jan. 12, 1915.

WITNESSES:

INVENTOR
Samuel M. Langston
BY
C. W. Fairbank
ATTORNEY

UNITED STATES PATENT OFFICE.

SAMUEL M. LANGSTON, OF CAMDEN, NEW JERSEY.

STOP MECHANISM.

1,124,468. Specification of Letters Patent. Patented Jan. 12, 1915.

Application filed June 5, 1913. Serial No. 771,819.

*To all whom it may concern:*

Be it known that I, SAMUEL M. LANGSTON, a citizen of the United States, and resident of Camden, in the county of Camden and State of New Jersey, have invented certain new and useful Improvements in Stop Mechanism, of which the following is a specification.

My invention is applicable for use in connection with any machine through which a continuous strip of material is to be passed either in the manufacture of the strip, the treating of it in any known manner as for instance the subdividing of it into narrower strips or the cutting of it up into shorter sections or sub-divisions or the mere rewinding of it. The strip may be either a sheet of paper, cloth or other material or may be tape, ribbon, cord, thread or the like.

The object of my invention is to provide a simple automatically operating mechanism for stopping the machine when a predetermined amount of material has passed through, the stopping being preferably accomplished by detaching the operating parts of the machine from the source of power, as for instance, by disengaging a clutch or by shifting a belt. In its preferred form the mechanism for effecting the stopping of the machine is normally held in such a position that when released it will move by the action of gravity to a second position and in doing so operate mechanism which stops the machine. In its preferred form it is especially applicable to a machine in which a clutch is interposed between the source of power and the driven parts of the machine and the gravity operated member in moving from one position to the other slowly separates the clutch members without sudden jar or jerky action.

Reference is to be had to the accompanying drawings in which similar characters of reference indicate corresponding parts throughout the several views, and in which—

Figure 1:
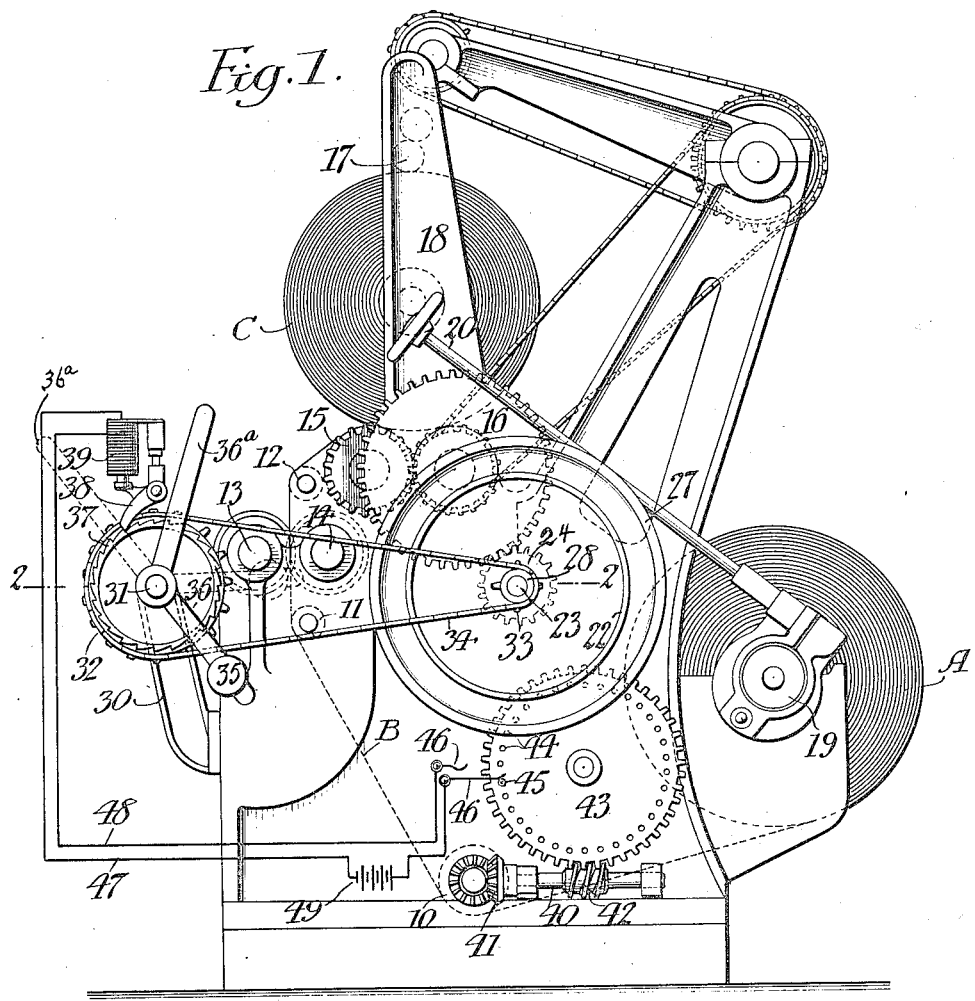
Figure 2:
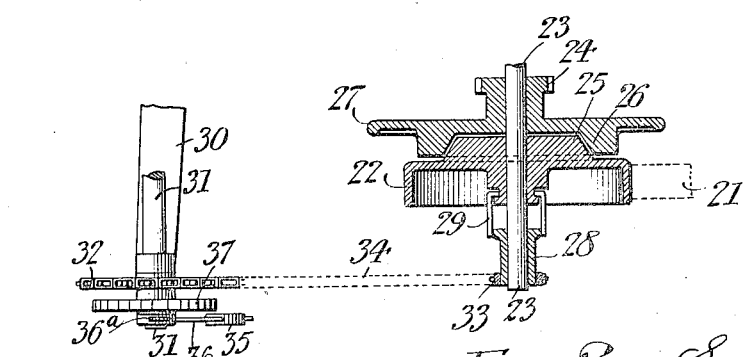

Figure 1 is an end view of a machine embodying one form which my invention may assume; Fig. 2 is a horizontal section of an end portion of the machine taken on the line 2—2 of Fig. 1.

As previously indicated my invention is applicable to various types of machines through which a fabricated sheet, thread, cord, tape or the like is passed for any purpose desired, but to facilitate a clear understanding of the invention and to illustrate one construction and mode of operation, I have illustrated a slitter and rewinder of the general type shown in my prior Patents Nos. 1,009,756 and 1,009,757, issued Nov. 28th, 1911. In this machine the sheet to be slitted and rewound is placed in the machine in the form of a roll A from which the sheet B passes over rollers 10, 11 and 12 to the roll C. Between the guide rollers 11 and 12 are a series of overlapping rotary cutters or blades mounted on shafts 13 and 14 for slitting the sheet. The rolls of slitted material are mounted on two positively driven supporting rollers 15 and 16 and beneath a pressure roller 17. The axis or core of the rolls of slitted material is free to rise vertically as the roll increases in size and is preferably guided in standards 18 on the main frame of the machine. Tension may be put on the material by a friction clamp 19 on the shaft of the roll A, and this clamp may be adjusted by a clamping screw having an operating shaft 20 extending to the front side of the machine, and within easy reach of the operator.

The machine is driven from any suitable source of power through a belt 21, Fig. 2, to a main drive pulley 22 on a stub shaft 23 mounted in the frame. A gear 24 loosely mounted on this shaft is connected to the operating parts of the machine. Between the drive pulley 22 and the gear 24 is a clutch made up of two clutch members 25 and 26, one connected with the drive pulley and the other connected with the gear. These clutch members are relatively movable so that the gear may be driven from the drive pulley or may remain stationary while the latter continues to rotate. Preferably the clutch is of a type commonly known as a cone clutch and the pulley is longitudinally movable on the shaft to secure the desired relative movement of the clutch members. The gear 24 and the clutch member 26 connected thereto may have a hand-wheel 27 whereby the machine may be operated when the clutch is disconnected. For moving the clutch member 25, I provide means normally stationary, but rotatable on the shaft 23 to secure a longitudinal movement of the clutch member. This may be of various different forms but a simple construction is illustrated which involves a sleeve 28 threaded on the outer end of the shaft and having one or more yoke arms engaging in an annular groove in the hub of the pulley. By rotating the sleeve 28 it will move endwise by reason of its threaded engagement with the shaft, but when at rest the pulley may freely rotate.

My improved stop mechanism may assume various different forms dependent upon the character of the machine to which it is applied, and therefore, I do not wish to be limited to the specific form about to be described and which is especially designed for use in connection with the slitter and rewinder illustrated, and the general construction of which has just been pointed out. In the specific form of stop mechanism illustrated the machine has mounted on the front portion thereof a bracket 30 supporting a shaft 31 having a sprocket wheel 32 connected to a smaller sprocket wheel 33 on the sleeve 28 by a chain 34. By rotating the sprocket wheel 32 in either direction the sprocket 33 and sleeve 28 will be rotated in the same direction, but through a greater angle to bring the clutch members into or out of operative engagement. Preferably the difference in size of the sprockets and the pitch of the thread of the sleeve 28 is such that a rotation of the sprocket 32 through less than one-half of a revolution will be sufficient to move the clutch from operative position to completely disengaged position or vice versa.

One of the most important features of my invention involves gravity operated mechanism normally locked in raised position but released and permitted to operate when a predetermined amount of material has passed through the machine. In its preferred form this gravity operated means includes a weight 35 mounted on a lever arm 36 connected to the shaft 31 or to the sprocket wheel 32. The angular position of the lever is such that when the clutch members are in operative engagement the lever will extend upwardly, preferably it is at a slight angle to the vertical. Preferably the pitch of the threads on the member 28 is such that a rotation of the sprocket wheels 32 and 33 in a clockwise direction from the position shown in Fig. 1 will release the clutch, and the lever thus projects upwardly from the shaft 31 on the side toward the body of the machine. The weight is preferably adjustable lengthwise of the lever, so that the required amount of power will be exerted during the downward movement thereof without imposing unnecessary labor in the manual return movement of the weight to its raised position. For throwing the clutch into position to start the machine the weight may be manually lifted, but preferably I provide a lever arm 36ª on the shaft 31 and projecting in the opposite general direction from the lever 36. Thus when the weight is down and the clutch disengaged the hand lever 36ª will project upwardly and forwardly from the shaft in such position that it may be readily grasped by the operator and depressed to raise the weight and throw in the clutch. As the dog will follow the teeth during this movement it is evident that a mere depression of the hand lever will be followed by an automatic locking of the clutch in operative position. The lever may be depressed as slowly as desired, so as to permit a gradual decreasing amount of slip in the clutch, and permit the machine to start as slowly and gently as desired.

For normally preventing the rotation of the sprocket wheels one of them, preferably the sprocket wheel 32 is connected with or carries a ratchet wheel 37 engaged by a pivoted dog or pawl 38. The pawl normally prevents a rotation in the direction which will release the clutch. Thus, the parts when in operation will be in the position indicated in dotted lines in Fig. 1. The machine is provided with suitable means for disengaging the pawl and permitting the sprocket wheels to rotate by the action of gravity on the weight 35 and to thus disconnect the clutch when a predetermined amount of material has passed through the machine. This predetermined amount may be a predetermined length of material measured by the required number of revolutions of either roll or of one of the idler rollers over which the material passes. If the material is to be marked or partially sub-divided into sections, as for instance when the machine is used for slitting and rewinding rolls of toilet paper, mechanism may be provided for releasing the dog 38 when a predetermined number as for instance 1000 sheets have been wound on the roll C. The character of this mechanism for releasing the dog may vary with the character of the machine and will vary with the character of the predetermined amount. This mechanism may be either electrical or mechanical, although for simplicity of construction I prefer an electrical mechanism. In the specific form illustrated I employ an electro-magnet 39 mounted in proper operative relationship to the dog or pawl 38, and provide a suitable circuit closer for energizing the magnet and disengaging the pawl at the desired time. As previously stated the disengaging of the pawl permits the weight to rotate the sprocket wheel 32, and pull out the clutch and stop the machine.

When the mechanism is to operate and stop the machine after a predetermined length of material has been passed through the machine, I may employ the mechanism illustrated. The roller 10 which is rotated by the material in passing over the same, may be made of a predetermined circumference as for instance one foot, and it may be geared to a shaft 40 by beveled gears 41. The shaft 40 may have a worm 42 meshing with a worm wheel 43. The diameter of the roll 10, the relative sizes of the two beveled gears, the pitch of the worm and the number of teeth on the worm wheel may be such that one revolution of the wheel 43 would be completed for each predetermined length of material, as for instance, a distance equal to the length of 1000 sheets of marked or partly sub-divided material such as toilet paper. The wheel 43 carries any suitable means for closing an electric circuit through the electro-magnet. As illustrated I provide the wheel with a series of small openings or sockets 44, adjacent the periphery and into any one of which a pin 45 may be placed. Two terminals 46, 46 of an electric circuit may be so placed that the pin in passing will press them together. This circuit is illustrated as including two wires 47 and 48 and a battery 49. This circuit, comprising two wires is illustrated to avoid confusion in the drawing, whereas in practice the frame of the machine would ordinarily form the return from the magnet to the circuit closer and by insulating the circuit closing member 46 from the machine, the circuit would be closed when the pin 45 contacts therewith. When the machine is started the pin 45 is placed in a socket 44 at a predetermined distance from the circuit closer 46, the distance varying with length of material which it is desired to wind before stopping the machine. If the diameter of the roll C is to control the stopping of the machine the circuit closer might be mounted on the part 18 of the frame.

Instead of employing a weighted swinging lever as the gravity operating power means other suitable mechanism could be employed.

The pin 45 or other member which reaches a predetermined position when the predetermined amount of material has passed through the machine might operate other connecting devices for positively lifting the dog 38 rather than the electric means shown.

The operation of the specific device illustrated is substantially as follows: A roll A of material to be slitted is placed in position and the material B is threaded through the machine on to the spindle of the rewinding mechanism. The pin 45 is inserted in one of the holes 44 of the wheel 43, the proper hole being selected in accordance with the amount of material which it is desired to slit, and rewind, before stopping the machine. The lever 36ª is moved from the full line position to the dotted line position, so as to rotate the two sprocket wheels, and move the clutch member 25 into engagement to start the machine. The slitting and rewinding operation then continues until the pin 45 brings the two contacts 46, 46 together, and closes the electric circuit. The magnet 39 will then lift the catch 38 and will permit the sprocket wheels to rotate clock-wise as the weight 35 and the lever 36 which are rigid with the sprocket wheel 32 swings downwardly from the dotted line to the full line position. This movement of the weighted lever and the corresponding movement of the sprockets and the chain, disengages the clutch 25 and permits the machine to stop.

It is of course evident that the specific combination and arrangement of parts illustrated might be used for controlling a machine in some other manner than stopping and starting the same.

Having thus described my invention, what I claim as new and desire to protect by Letters-Patent is:

1. A machine of the class described having a clutch for controlling the delivery of power to the machine, a rotatable member operatively connected to said clutch for releasing the clutch, gravity operated means for rotating said member, means normally preventing operation of said gravity operated means, and electrically operated means for automatically releasing said gravity operated means upon the passage of a predetermined amount of material through the machine.

2. A machine of the class described having a movable member for controlling the delivery of power to said machine, a ratchet wheel operatively connected thereto to move said member when rotated, gravity operated means normally tending to rotate said ratchet wheel in one direction, a pawl normally preventing the rotation of said ratchet wheel by said gravity operated means, and means for automatically disengaging said pawl upon the passage of a predetermined amount of material through the machine.

3. A machine of the class described having a movable member for controlling the delivery of power to the machine, a ratchet wheel rotatable in one direction and operatively connected to said member to disconnect said machine from the source of power, means for normally preventing said rotation, means tending to rotate said ratchet wheel in said direction, and means for automatically releasing said ratchet wheel upon the passage of a predetermined amount of material through the machine.

4. A machine of the class described having a movable member for controlling the delivery of power to the machine, a sprocket wheel connected to said member, a second sprocket wheel of larger diameter, a chain connecting the same, means normally tending to rotate said second mentioned wheel through a portion of one revolution to stop the machine, means normally preventing said rotation, and means operated upon the passage of a predetermined amount of material through the machine for automatically releasing said second-mentioned sprocket wheel.

5. A machine of the class described having a cone clutch member, a rotatable member for controlling the positioning of said clutch member, a sprocket wheel connected to said member, a second sprocket wheel of larger diameter, a chain connecting said sprocket wheels, means tending to rotate said second mentioned sprocket wheel through a portion of a revolution in one direction, means normally preventing the operation of said first-mentioned means, and means controlled by the passage of material through the machine for automatically releasing said first-mentioned means.

6. A machine of the class described having a cone clutch, a rotatable member for controlling the positioning of said clutch, a sprocket wheel connected to said member, a second sprocket wheel of larger diameter, a chain connecting said sprocket wheels, a weighted lever normally held in raised position and normally tending to rotate said second-mentioned sprocket wheel through a portion of a revolution, and means controlled by the passage of material through the machine for releasing said weighted lever.

7. A machine of the class described having a ratchet wheel, means connected thereto for controlling the stopping and starting of the machine, means tending to rotate said ratchet wheel in one direction to stop the machine, a dog normally preventing said rotation, of said ratchet wheel, an electro-magnet for releasing said dog, and a circuit closer on said machine for operating said electro-magnet upon the passage of a predetermined amount of material through said machine.

8. A machine of the class described having driving means, means normally tending to stop the machine, a dog normally preventing the operation of said means, an electro-magnet for releasing said dog, a circuit closer for said electro-magnet, a roller over which material may pass, and means for operating said circuit closer upon the completion of a predetermined number of revolutions by said roller.

9. A machine of the class described having a shaft, a weighted lever normally held in raised position and normally tending to rotate said shaft in one direction to stop the machine, a hand lever for rotating said shaft in the opposite direction to start said machine, means normally tending to prevent said first mentioned rotation and means controlled by the passage of material through said machine for automatically rendering said first-mentioned means inoperative.

10. A machine of the class described having a roller rotating with the material upon the passage of the latter through the machine, a member normally in inoperative position and normally tending to move to operative position to stop the machine, retaining means normally preventing said movement to operative position and means including a circuit closer operating upon a predetermined number of rotations of said roller for operating said releasing means.

Signed at Camden in the county of Camden and State of New Jersey this 29 day of May, A. D. 1913.

SAMUEL M. LANGSTON.

Witnesses:
ANNA W. KUENZEL,
WALTER A. SQUIER.